Figure 4C:
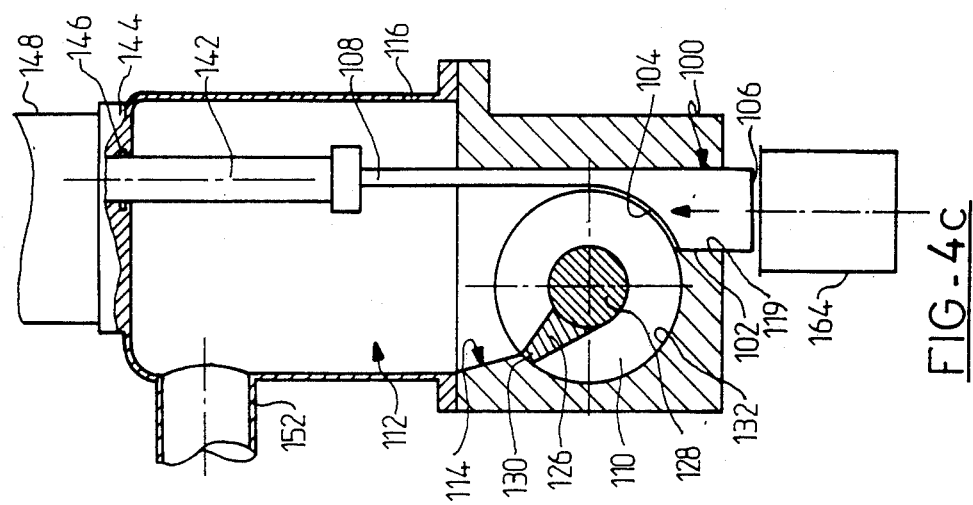

United States Patent [19]

Torterotot

[11] Patent Number: 4,666,067
[45] Date of Patent: May 19, 1987

[54] METERING DEVICE, ESPECIALLY FOR FOODSTUFFS

[76] Inventor: Roland Torterotot, Le Plessis Mornay, 78730 Longvilliers, France

[21] Appl. No.: 821,689

[22] Filed: Jan. 23, 1986

[30] Foreign Application Priority Data

Jan. 28, 1985 [FR] France ............................ 85 01122
Oct. 22, 1985 [FR] France ............................ 85 15659

[51] Int. Cl.$^4$ ............................................ G01F 11/00
[52] U.S. Cl. ................................... 222/262; 222/311; 222/317; 222/318; 418/219
[58] Field of Search ............... 418/217, 219; 141/248, 141/258, 259; 222/252, 256, 262, 318, 319, 342, 386–388, 216, 217, 310, 311, 317

[56] References Cited

U.S. PATENT DOCUMENTS 2,827,207  3/1958  Sprole .
3,125,136  3/1964  Miller et al. ................... 222/252
3,850,345  11/1974  Merritt .

FOREIGN PATENT DOCUMENTS 1095533  12/1960  Fed. Rep. of Germany .
2213783  9/1973  Fed. Rep. of Germany .
2072623  10/1981  United Kingdom ............... 222/216

Primary Examiner—H. Grant Skaggs
Attorney, Agent, or Firm—Mason, Kolehmainen, Rathburn & Wyss

[57] ABSTRACT

The device according to the invention comprises a cylindrical metering chamber (10) of circular section and with an approximately horizontal axis, which, in its upper part, has an aperture (14) opening out into a reservoir (16) filled with product to be metered (12), and which communicates with an outlet channel (18) in which a slide valve (20) moves periodically between a high closing position and a low end-of-metering position; a vane (26) extending radially along a shaft (28) and capable of being driven with a rotary movement of controlled amplitude, during which the free end (30) of the vane (26) sweeps the cylindrical internal surface (32) of the metering chamber (10); and a flap (34) capable of translational movement and of entering the metering chamber (10) periodically to delimit a wall by tangential contact with the said shaft (28), and then withdrawing to allow a complete revolution of the vane (26).

19 Claims, 9 Drawing Figures

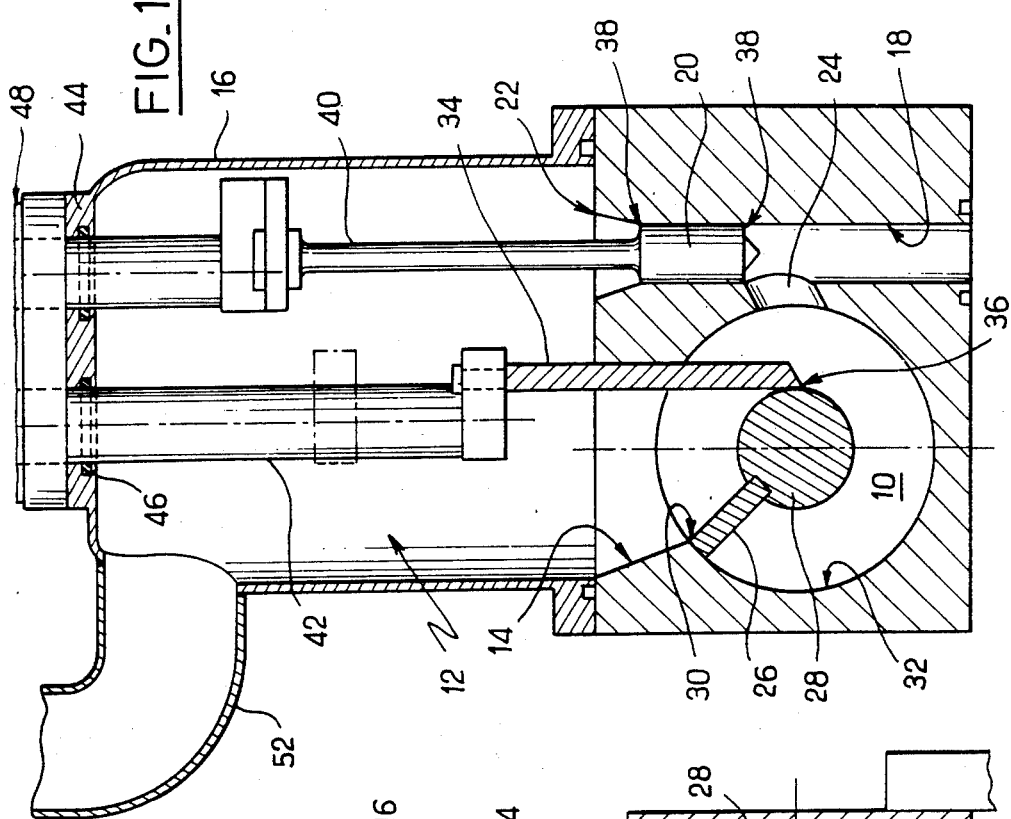
FIG_1
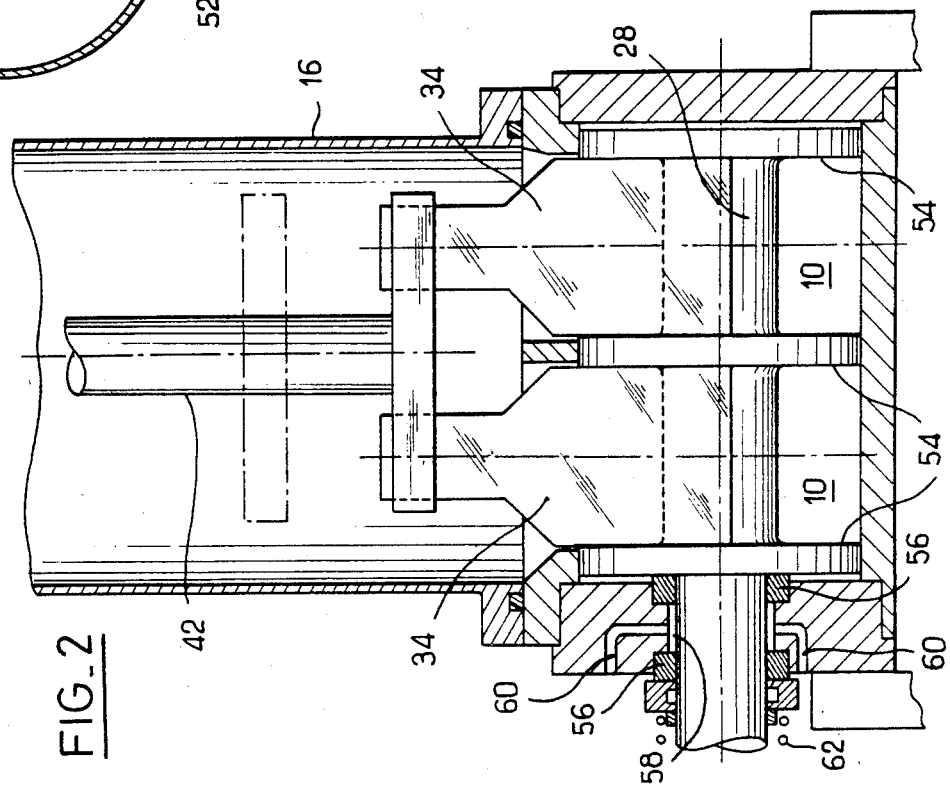
FIG_2

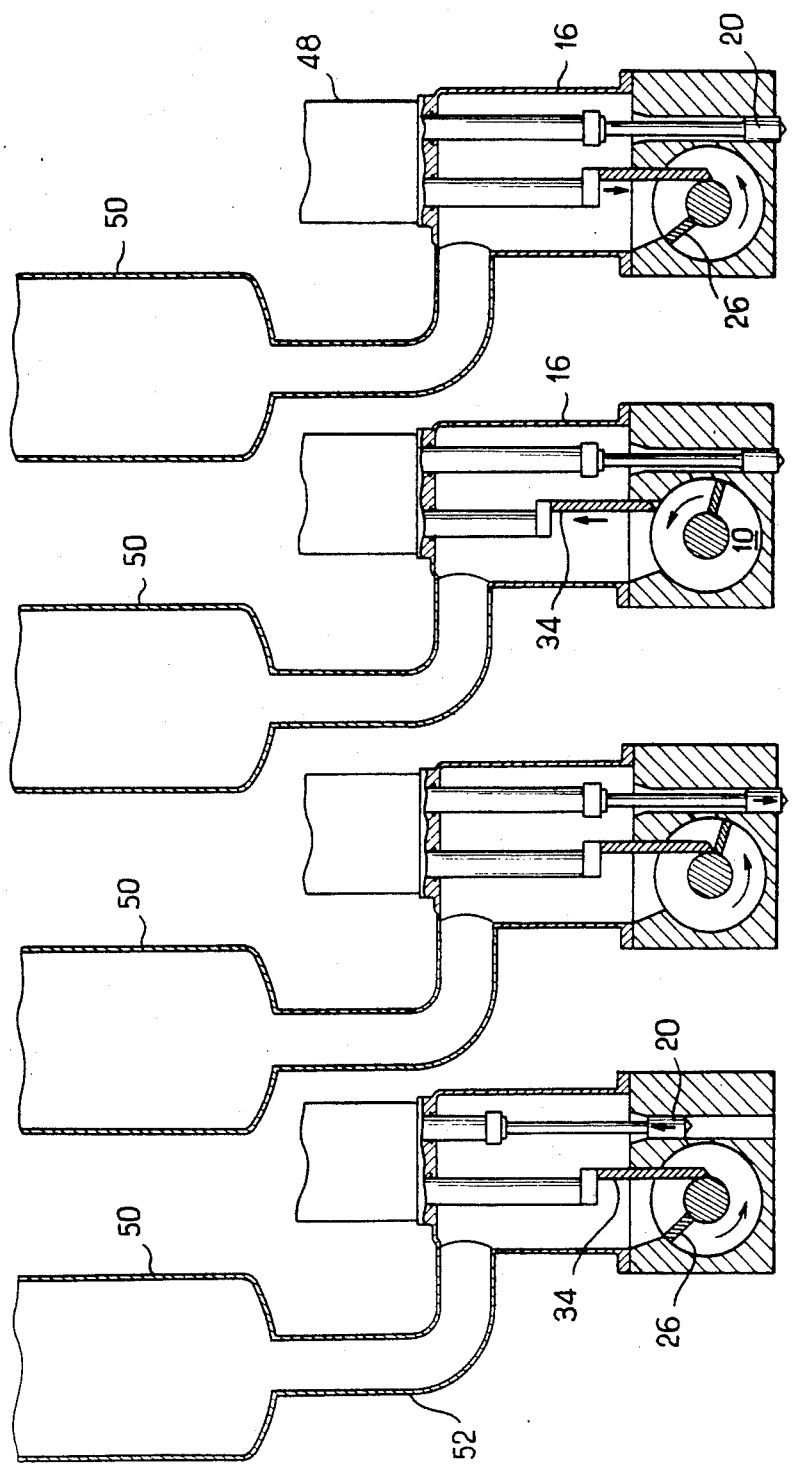

METERING DEVICE, ESPECIALLY FOR FOODSTUFFS

The present invention relates to a metering device capable of delivering a determined volume of product, in particular foodstuffs.

In the particular case of foodstuffs, the products to be metered can arbitrarily consist of homogenenous pasty products or of heterogeneous products in the form of pieces mixed with an interstitial liquid medium of variable viscosity. To ensure correct packaging of these products, they must be metered as precisely as possible and ejected directly into an appropriate container, especially cans, jars or analogous receptacles, in which they will subsequently be preserved.

In the prior art and in particular in the food industry, a number of devices designed for delivering metered quantities of product are already known. These known devices are generally in the form of a metering pump involving the action of a metering piston driven with a reciprocating movement. Metering pumps of this type are frequently associated with a box whose rotation enables the piston chamber to open and close so as to ensure respectively the feeding and then the removal and discharge of the metered product.

Thus, the piston chamber is necessarily fed in a discontinuous fashion, which results in a number of disadvantages, the main one being restriction of the product packaging rates. Moreover, metering pumps of the type wih a metering piston generally give rise to a hammering phenomenon, making it difficult, if not impossible, to keep the metering steady, especially in the case of heterogeneous products and/or products containing included air bubbles.

The object of the present invention was precisely to solve the problems referred to above. The metering device according to the invention was moreover designed to permit continuous feeding of the product to be metered, without high pressures being exerted on the product at any point in the device or at any time during the metering process.

According to the present invention, the metering device capable of delivering a determined volume of product, in particular foodstuffs, comprises:

a cylindrical metering chamber of circular section and with an approximately horizontal axis, which, in its upper part, has an aperture opening out into a reservoir surmounting the said metering chamber and filled with product to be metered, and which communicates with an outlet channel in which a slide valve moves periodically between a high closing position and a low end-of-metering position;

a vane extending radially along a shaft coaxial to the metering chamber, and capable of being driven with a rotary movement of controlled amplitude, during which the free end of the vane sweeps the cylindrical internal surface of the metering chamber; and a flap capable of translational movement and of entering the metering chamber periodically to delimit a wall by tangential contact with the said shaft, and then withdrawing to allow a complete revolution of the said vane.

The movements of the flap, vane and slide valve are moreover controlled interdepedently, advantageously by motorized reduction gears which are themselves governed by a computer of the microprocessor type.

According to the invention, the interdependent control of the movements of the flap, vane and slide valve is effected in such a way that:

*at the start of metering:

the vane (26) occupies a starting position facing the cylindrical internal surface (32) of the metering chamber (10), the flap (34) occupies a low position in which it closes the metering chamber (10) by tangential contact with the shaft (28), and the slide valve (20) occupies the high position in which it closes the outlet channel (18) just above the level of the communication (24) between the metering chamber (10) and the outlet channel (18);

*during metering:

the flap (34) remains in the low position, the slide valve (20) remains in the high position, and the vane (26) is driven with a rotary movement of predetermined limited amplitude, thus discharging, through the outlet channel (18), the quantity of product displaced by the rotation of the vane (26); and

*at the end of metering:

the flap (34) remains in the low position, the vane (26) remains immobilized in its end-of-rotation position, and the slide valve (20) slides into the low position to discharge the remainder of the quantity of metered product present in the outlet channel (18).

Between two successive metering operations:

*the flap occupies a high position outside the metering chamber,

*the vane continues to rotate so as to return to its starting position, then

*the flap is brought back to its low position, and

*the slide valve returns to the high closing position.

Figure 4B:
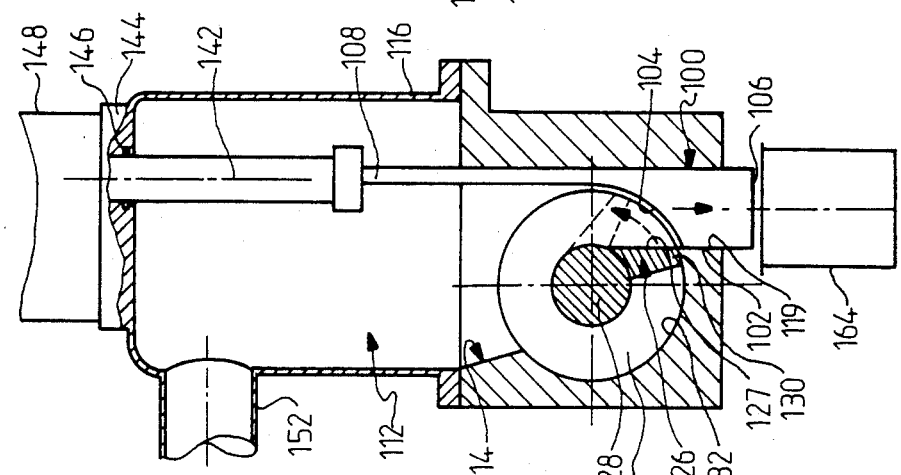
Figure 4A:
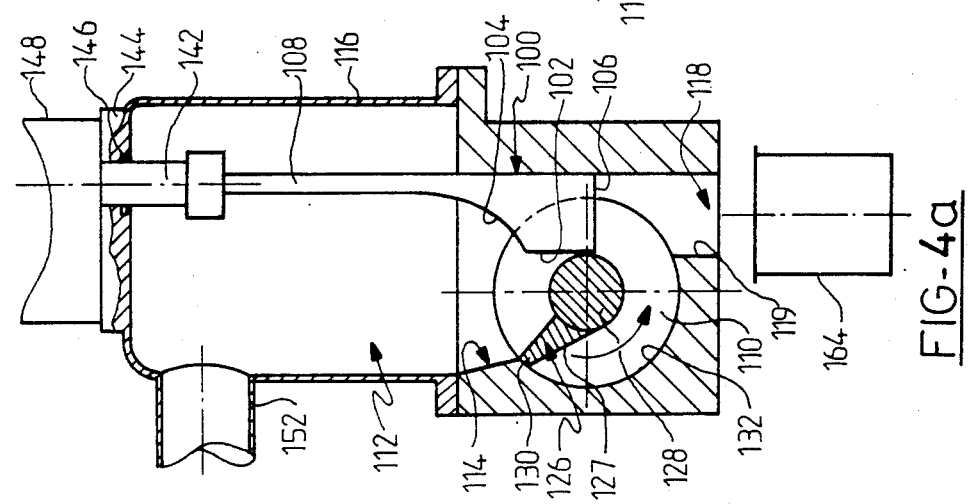

Further characteristics and advantages of the subject of the present invention will become apparent on reading the detailed description given below, especially taking into account the attached figures in which:

FIG. 1 shows a partial view in section of the metering device according to the invention, FIG. 2 shows a side view of the metering device of FIG. 1, FIGS. 3a to 3d diagrammatically illustrate the operation of the device according to the invention, and FIGS. 4a to 4c diagrammatically illustrate the operation of a variant of the above device, which has a simplified construction and makes it possible to reduce the duration of a metering cycle for the same quantity of product, respectively in the start-of-metering position, the end-of-metering position and the position of return to the initial position between two successive metering operations.

In the various figures attached, corresponding components carry identical reference numbers.

The metering device according to the present invention comprises firstly a cylindrical metering chamber 10 of circular section and with an approximately horizontal axis. This metering chamber 10 is completely filled with the product to be metered, 12, during all the metering phases. In its upper part, the metering chamber 10 has an aperture 14 opening out into a reservoir 16 surmounting the said chamber 10. The reservoir 16 is also completely filled with product to be metered, 12. This reservoir can be fitted to the body of the metering chamber in a leaktight manner by any appropriate means, for example by bolting, with the insertion of gaskets.

The metering chamber 10 also communicates with an outlet channel 18 in which a slide valve 20 moves which is capable of sliding periodically between a high closing position and a low end-of-metering position. According to an advantageous characteristic of the present invention, the upper end 22 of the outlet channel 18 also opens out into the reservoir 16. This outlet channel preferably runs in a vertical direction and is preferably located in the immediate vicinity of the metering chamber 10.

The communication between the metering chamber 10 and the outlet channel 18 is formed by means of a duct 24, which is preferably inclined relative to the horizontal in the direction of rotation of the vane 26.

This vane 26, which extends radially along a shaft 28 coaxial to the metering chamber 10, is capable of being driven with a rotary movement of controlled amplitude. During its rotation, the free end 30 of the vane 26 sweeps the cylindrical internal surface 32 of the metering chamber 10.

The metering device according to the invention also comprises a flap 34 capable of translational movement and of entering the metering chamber periodically and then withdrawing. When the flap 34 occupies the low position in the metering chamber 10, it closes this chamber by tangential contact with the shaft 28. Provision is made so that the flap 34 can then withdraw from the metering chamber 10 again so as to allow a complete revolution of the vane 26, enabling the latter to return to its starting position.

In the particular embodiment described, it is seen that the lower end 36 of the flap 34 is beveled so as to define a cutting edge which, in the low position of the flap 34, goes substantially beyond the line of tangential contact with the shaft 28. This cutting edge will therefore make it possible to chop up any pieces of product encountered by the flap 34 during its displacement in the direction of the shaft 28. Analogously, the slide valve 20 is in the form of a piston whose end surfaces are provided with cutting edges 38. During the displacement of the slide valve, either downwards or upwards, it is thus possible to cut up the pieces of product which have become immobilized in the vicinity of the communication duct 24.

The slide valve 20 is controlled in its translational displacement by means of a rod 40 which passes through the reservoir 16 filled with the product to be metered. Advantageously, the control rod 40 of the slide valve 20 has a smaller cross-section than the outlet channel 18 so that the product 12 can be forced back towards the reservoir 16 when the said slide valve occupies its low position. It will also be observed that, in this low position, the lower end of the slide valve 20 goes beyond the level of the lower aperture in the outlet channel 18 so as to ensure the complete ejection of that quantity of product to be metered which has remained in the outlet channel.

It will also be observed that the rod 42 for controlling the movement of the flap 34 passes through the reservoir 16 in the same way as the rod 40. The displacement of the two rods 40 and 42 thus ensures that the product 12 filling the reservoir 16 is mixed, as it were, thereby favoring continuous gravity feeding of the metering chamber 10.

The control rods 40 and 42 pass through the reservoir 16 via an upper cover 44 in which the gaskets 46 are fitted. Beyond the cover 44, the rods 40 and 42 extend into a sterile chamber 48 for protecting the product against any form of contamination resulting from the sliding of the rods 40 and 42. Outside this sterile chamber 48, the rod ends are, for example, coupled to appropriate conventional motorized reduction gears (not shown in the drawings).

The reservoir 16 is continuously fed by a buffer tank 50 located at a higher level than the reservoir 16, the communication being provided by means of a connection duct 52. The buffer tank 50 containing the product to be metered must be placed at a sufficiently high level to ensure correct filling of the reservoir 16. In practice, it is also possible to envisage an additional device surmounting the buffer tank and exerting a slight pressure on the product to be metered, thereby favoring the feeding of the reservoir 16.

FIG. 2 illustrates a particular embodiment of the metering device according to the invention, which comprises two metering chambers 10 adjacent to one another. Of course, it is perfectly possible to increase the number of these metering chambers as required. In FIG. 2, it is seen that the two adjacent chambers shown are in fact delimited by cheeks 54 integral with the shaft 28. The latter is fitted in the body of the metering device with the aid of sealing rings 56 located on either side of a sterile annular chamber 58 through which sterile air, circulating in the ducts 60, flows. The sealing rings 56 are subjected to the action of the force exerted by the spring 62.

To provide a clear understanding of the mode of operation of the metering device described above, FIGS. 3a to 3d illustrate the position of the main components of the device during the essential metering steps.

FIG. 3a corresponds to the start of metering. At this moment, the vane 26 occupies its starting position, which is necessarily facing the internal surface 32 of the metering chamber 10. This starting position can be, for example, the one shown in FIG. 3a, i.e. the vane 26 arrives level with the aperture 14 in the chamber 10. Still in this first position, the flap 34 occupies its low position, thus closing the metering chamber 10 by contact with the shaft 28. Finally, the slide valve 20 occupies its high closing position, thus preventing any communication between the chamber 10 and the reservoir 16.

FIG. 3b corresponds to the end of the metering operation. It is seen that, between these two steps, the flap 34 has remained in the low position and that the vane has rotated through a predetermined angle, thus discharging, through the outlet channel 18, a certain quantity of product displaced during its rotation. It is clear that, during metering, the slide valve 20 remains in the top position to prevent the product 12 from returning towards the reservoir 16.

After immobilization of the vane 26 in its end-of-metering position, the slide valve 20 slides into the low position in order to discharge the remaining product present in the outlet channel. During this final product ejection phase, the flap 34 has remained in the low position.

FIG. 3c illustrates the return of the various components to their starting position for performing another metering operation. First of all, the flap 34 must of course withdraw from the metering chamber 10 so that the vane 26 can return to its starting position by continuing to rotate. It will be observed that, at this stage, the slide valve 20 has remained in its low position. Then, the flap 34 falls again to close the metering chamber 10, during which movement it is caused to displace a quantity of product to be metered, present in the chamber. Since the slide valve 20 is still occupying its low position, communication is then permitted between the metering chamber 10 and the reservoir 16. Consequently, the displacement of the flap 34 will not compress the substance to be metered, 12, which can escape through the duct 24 and be recycled into the reservoir 16.

Then, when the flap 34 is occupying the low position in which it closes the metering chamber 10, and before the vane 26 starts to rotate, the slide valve 20 returns to its high closing position.

It is thus seen that the metering device according to the invention has decisive advantages over the devices of the prior art. Thus, the metering device according to the invention is fed continuously without any difficulty. The product to be metered is delivered without any notable pressure being exerted on the paste at any point in the device. Moreover, the product moves essentially under gravity, making it possible to meter certain heterogeneous products which were virtually impossible to meter exactly with the devices of the prior art, such as swollen products or alternatively heterogeneous products of the fruit salad type.

In the above description of the operation of the device, it was apparent that the various moving components in the reservoir 16 caused the product to be mixed, the said product furthermore being subjected to circulation due to the return of a quantity of product to the reservoir through the outlet channel 18. The product to be metered is therefore continually renewed and it is important to note that there are no blind recesses where stagnation of the product might be observed, this phenomenon being just as troublesome for sterile products as for non-sterile products, the latter being likely to undergo degradation processes, especially of bacterial origin, in this case.

The actual design of the device according to the invention makes it possible, without any difficulty, to modify the doses of product to be delivered and also to change from one type of product to a different type.

To clean the whole of the device, and in particular the metering chamber 10, it is necessary only to bring the flap 34 back to its high position, then feed the device with an appropriate washing liquid and drive the shaft 28, carrying the vane 26, with a continuous rotary movement.

The actual design of the metering device according to the invention makes it possible always to deliver the same volume of product with a very high degree of certainty. Of course, the metering can be adjusted simply by varying the rotational displacement of the vane 26. The maximum amplitude of rotation of the vane corresponds to the two limiting positions illustrated in FIGS. 3a and 3b. It is clear that all the intermediate positions may be selected for delivering fractions of the maximum dose.

If the density of the product to be metered is capable of varying during use, the device according to the invention enables the metering to be adjusted very easily. In fact, the metered product is delivered into a receptacle 64, which can either be placed directly on an automatic weighing device or be transferred to such a device. All the weight variations recorded in this way as a result of density changes are thus transmitted directly to the control computer, which will calculate the correction to be made and will transmit the corresponding information to the motorized reduction gear controlling the rotation of the shaft 28. The effect of such a correction is of course to modify the useful amplitude of rotation of the vane 26 inside the metering chamber 10.

According to an interesting variant of the metering device according to the invention, the flap and the slide valve are made as a single moving component capable of moving periodically between a high closing position, in which a vertical face of the said component is in tangential contact with the shaft carrying the vane, and a low end-of-metering position, the said moving component furthermore being shaped so that, in the said low position, the vane which is continuing to rotate can pass through and return to its starting position.

Advantageously, the single moving component has an approximately cylindrical, incurved surface connected to the vertical face, to the said incurved surface being swept by the free end of the vane as the latter returns to its starting position.

It is also advantageous for the vane to have an active face connected tangentially to the bearing shaft, the said active face being essentially vertical at the end of metering so as to extend the corresponding wall of the outlet channel.

To ensure complete ejection of the quantity of product, the single moving component should, in the low position, go beyond the level of the aperture in the outlet channel.

Preferably, the control rod of the single moving component passes through the product reservoir so as to protect the product against any form of contamination.

For reliable repeat metering compatible with high production rates, the movements of the vane and the single moving component are advantageously caused by motorized reduction gears governed by a computer of the microprocessor type.

According to a preferred design of the device, the interdependent control of the movements of the vane and the single moving component is effected so that:

(a) at the start of metering: the vane occupies a predetermined starting position facing the cylindrical internal surface of the metering chamber, and the single moving component is in the high closing position, ensuring on the one hand the closing of the metering chamber by tangential contact with the shaft and on the other hand the communication between the metering chamber and the outlet channel;

(b) during metering: the single moving component remains in the high closing position while the vane is driven with a rotary movement of predetermined amplitude, thus discharging the corresponding quantity of product through the outlet channel; and (c) at the end of metering: the vane is immobilized in its end-of-rotation position and the single moving component then slides into the low position to finish discharging the product and to allow the vane to continue rotating up to its starting position.

In particular, at the end of metering, the vane is immobilized in such a position that its active face is vertical, it then being possible for the said active face to be scraped as the single moving component slides past towards its low position.

Very good precision can be achieved in the metering operation in particular if the single moving component does not return to its high closing position until the vane has reached its predetermined starting position.

As in the variant described above, the metering device according to the present invention comprises firstly a cylindrical metering chamber 110 of circular section and with an approximately horizontal axis. This metering chamber 110 is completely filled with the product to be metered, 112, during all the metering phases. In its upper part, the metering chamber 110 has an aperture 114 opening out into a reservoir 116 surmounting the said chamber 110. The reservoir 116 is also completely filled with product to be metered, 112. This reservoir can be fitted to the body of the metering chamber in a leaktight manner by any appropriate means, for example by bolting, with the insertion of gaskets; the reservoir 116 is furthermore fed continuously by a buffer tank (not shown) located at a higher level, communication being provided by means of a connection duct 152 (it is naturally possible to make provision for an additional device surmounting the buffer tank and exerting a slight pressure on the product to be metered, thereby favoring the feeding of the reservoir 116). The metering chamber 110 also communicates with an essentially vertical outlet channel 118 formed in the low part of the device. Provision is also made for a vane 126, which extends radially along a shaft 128 coaxial to the metering chamber 110, the said vane being capable of being driven with a rotary movement of controlled amplitude; during its rotation, the free end 130 of the vane 126 sweeps the cylindrical internal surface 132 of the metering chamber 110.

According to an essential feature of the invention, provision is made for a single moving component 100, which replaces the flap and the slide valve of the device of the variant described above, considerably simplifying the construction of the metering device and providing other advantages, as will be described below.

The single moving component 100 can move periodically between a high closing position (FIG. 4a), in which a vertical face 102 of the said component is in tangential contact with the shaft 128 carrying the vane 126, and a low end-of-metering position (FIG. 4b).

The single moving component 100 is furthermore shaped so that, with the latter in its low position, the vane 126, which is continuing to rotate, can pass through and return to its starting position; preferably, the said component has an essentially cylindrical, incurved surface 104 connected to the vertical face 102, the said incurved surface being swept by the free end 130 of the vane 126 as the latter returns to its starting position.

The single moving component 100 thus has a section which tapers upwards, defining an upper portion 108 connected to a control rod 142, the displacement of which also ensures that the product 112 is mixed to a certain extent, thereby favoring continuous gravity feeding of the metering chamber 110. The control rod 142 passes through the reservoir 116 via an upper cover 144 in which the gaskets 146 are fitted. Beyond the cover 144, the rod extends into a sterile chamber 148 for protecting the product against any form of contamination resulting from the sliding of the rod 142. Outside this sterile chamber 148, the end of the rod is, for example, coupled to an appropriate conventional motorized reduction gear (not shown) which, like the motor driving the vane-carrying shaft, is preferably governed by a computer of the microprocessor type.

To provide a clear understanding of the mode of operation of the device improved in this way, FIGS. 4a to 4c illustrate the position of its main components during the essential metering steps.

FIG. 4a corresponds to the start of metering. At this moment, the vane 126 occupies a predetermined starting position facing the internal surface 132 of the metering chamber 110; this position is directly related to the desired quantity of product to be metered, the position in FIG. 4a, level with the aperture 114 in the chamber 110, corresponding to the maximum dose. As regards the single moving component 100, this is in the high position, closing the metering chamber through contact between the vertical face 102 and the shaft 128 (the lower edge of this vertical face is preferably at a lower level than the axis of the shaft so as to ensure correct obstruction).

The vane 126 then rotates through a predetermined angle up to the position illustrated in FIG. 4b. The single moving component 100 then slides downwards, guaranteeing that the quantity metered in this way is completely ejected through the channel 118 into a receptacle 164; complete ejection is ensured by making provision for the lower face 106 to arrive at a level below that of the outlet orifice.

It is advantageous to make provision for the vane 126 to have an active face 127 connected tangentially to the bearing shaft 126, this active face being essentially vertical at the end of metering so as to extend the corresponding wall 119 of the outlet channel 118, as illustrated in FIG. 4b. Thus, as soon as the vane 126 has become immobilized in the end-of-metering position, the single moving component 100 slides downwards, scraping the faces 127 and 119 in a single pass, as far as the low position of the said component, thereby effecting complete ejection of the desired quantity of product.

The vane 126 can immediately continue to rotate, the end 130 of the said vane scraping the incurved surface 104 of the single moving component 100 (intermediate position illustrated in broken lines), which prevents any product from sticking to the said surface and shortens the duration of the cycle relative to the device of the variant described above, with separate flap and slide valve (in this case, it is necessary to wait for the flap to rise completely for the vane to continue rotating).

The rotation of the vane 126 is stopped when its predetermined angular position is reached (FIG. 4c) and the single moving component 100 rises to its high closing position, the vertical face 102 of the said component removing the excess portion of product so that the quantity to be metered remains constant and well defined during the successive metering cycles. Furthermore, care will be taken to ensure that the face 102 has sufficient height to close the outlet passage of the metering chamber 110 while the single moving component 100 is rising. The device is then once again in the position of FIG. 4a and the operation can recommence.

It is self-evident that provision could be made, as in the previous variant, for several adjacent metering chambers delimited, for example, by cheeks integral with the central shaft carrying the associated vanes.

When the device of the invention is used, the product to be metered is continually renewed and it is important to note that there are no blind recesses where stagnation of the product might be observed, this phenomenon being just as troublesome for sterile products as for non-sterile products, the latter being likely to undergo degradation processes, especially of bacterial origin, in this case.

The actual design of the device makes it possible, without any difficulty, to modify the doses of product to be delivered and also to change from one type of product to a different type.

In fact, if the density of the product to be metered is capable of varying during use, the device according to the invention enables the metering to be adjusted very easily; the metered product is delivered into a receptacle 164, which can either be placed directly on an automatic weighing device or be transferred to such a device; all the weight variations recorded in this way as a result of density changes are thus transmitted directly to the control computer, which will calculate the correction to be made and will transmit the corresponding information to the motorized reduction gear controlling the rotation of the shaft 128. The effect of such a correction is of course to modify the useful amplitude of rotation of the vane 126 inside the metering chamber 110.

Of course, the present invention is not limited to the particular embodiment described above; on the contrary, it is perfectly possible to envisage a number of modified embodiments of this invention without thereby exceeding its scope.

What is claimed is:

1. A metering device capable of delivering a determined volume of product, in particular foodstuffs, which comprises:
   a cylindrical metering chamber (10) of circular section and with an approximately horizontal axis, which, in its upper part, has an aperture (14) opening out into a reservoir (16) surmounting the said metering chamber and filled with product to be metered (12), and which communicates with an outlet channel (18) in which a slide valve (20) moves periodically between a high closing position and a low end-of-metering position;
   a vane (26) extending radially along a shaft (28) coaxial to the metering chamber (10), and capable of being driven with a rotary movement of controlled amplitude, during which the free end (30) of the vane (26) sweeps the cylindrical internal surface (32) of the metering chamber (10); and
   a flap (34) capable of translational movement and of entering the metering chamber (10) periodically to delimit a wall by tangential contact with the said shaft (28), and then withdrawing to allow a complete revolution of the said vane (26), and wherein the movements of the flap (34), vane (26) and slide valve (20) are controlled interdependently.

2. The device as claimed in claim 1, wherein said flap, said vane and said slide valve are positioned at different relative positions during metering allowing the interdependent control of the movements of the flap, vane an slide valve to be effected in such a way that:
   at the start of metering:
      the vane (26) occupies a starting position facing the cylindrical internal surface (32) of the metering chamber (10),
      the flap (34) occupies a low position in which it closes the metering chamber (10) by tangential contact with the shaft (28), and
      the slide valve (20) occupies the high position in which it closes the outlet channel (18) just above the level of the communication (24) between the metering chamber (10) and the outlet channel (18);
   during metering:
      the flap (34) remains in the low position,
      the slide valve (20) remains in the high position, and
      the vane (26) is driven with a rotary movement of predetermined limited amplitude, thus discharging, through the outlet channel (18), the quantity of product displaced by the rotation of the vane (26); and
   at the end of metering:
      the flap (34) remains in the low position,
      the vane (26) remains immobilized in its end-of-rotation position, and
      the slide valve (20) slides into the low position to discharge the remainder of the quantity of metered product present in the outlet channel (18).

3. The device as claimed in claim 1, said flap, said vane and said slide valve are mounted at different relative positions during metering wherein, between two successive metering operations:
   the flap (34) occupies a high position outside the metering chamber (10),
   the vane (26) continues to rotate so as to return to its starting position, then
   the flap (34) is brought back to its low position, and
   the slide valve (20) returns to the high closing position.

4. The device as claimed in claim 1 wherein the outlet channel (18) runs in a vertical direction and is preferably located in the immediate vicinity of the metering chamber (10).

5. The device as claimed in claim 1, wherein the communication between the metering chamber (10) and the outlet channel (18) is formed by means of a duct (24), which is inclined relative to the horizontal in the direction of rotation of the vane (26).

6. The device as claimed in claim 1, wherein the slide valve (20) is in the form of a piston whose end surfaces are provided with cutting edges (38).

7. The device as claimed in claim 1, wherein said slide valve (20) comprises a control rod (40) having a smaller cross-section, the control rod (40) of the slide valve (20) has a smaller cross-section than the outlet channel (18) so that the product (12) can be forced back towards the reservoir (16) when the said slide valve (20) occupies its low position.

8. The device as claimed in claim 1, wherein, in the low position, the slide valve (20) goes beyond the level of the aperture in the outlet channel (18).

9. The device as claimed in claim 1, wherein the flap has lower end (36) which is beveled so as to define a cutting edge which, in the low position of the flap (34), goes substantially beyond the line of tangential contact with the shaft (28).

10. The device as claimed in claim 1, wherein the slide valve comprises a control rod, and wherein said flap valve also comprises a control rod, both of said control rods passing through the product reservoir (16).

11. The device as claimed in claim 1, wherein the reservoir (16) is continuously fed by a buffer tank (50) located at a higher level than the reservoir (16).

12. The device as claimed in claim 1, wherein the function of the flap and of the slide valve are performed by a single moving component (100) capable of moving periodically between a high closing position, in which a vertical face (102) of the said component is in tangential contact with the shaft (128) carrying the vane (126), and a low end-of-metering position, the said moving component furthermore being shaped so that, in the said low position, the vane (126), which is continuing to rotate, can pass through and return to its starting position.

13. The device as claimed in claim 12 wherein the single moving component (100) has an approximately cylindrical, incurved surface (104) connected to the vertical face, the said incurved surface being swept by the free end (130) of the vane (126) as the latter returns to its starting position.

14. The device as claimed in claim 12, wherein the vane (126) has an active face (127) connected tangentially to the bearing shaft (128), the said active face being essentially vertical at the end of metering so as to extend the corresponding wall (119) of the outlet channel (118).

15. The device as claimed in claim 12, wherein, in the low position, the single moving component (100) goes beyond the level of the aperture in the outlet channel (118).

16. The device as claimed in claim 12, wherein a control rod (108, 142) of the single moving component (100) passes through the product reservoir (116).

17. The device as claimed in claim 12, wherein said flap, said vane and said slide valve are positioned at different relative positions during metering allowing the interdependent control of the movements of the vane (126) and the single moving component (100) to be effected so that:

at the start of metering: the vane (126) occupies a predetermined starting position facing the cylindrical internal surface (132) of the metering chamber (110), and the single moving component (100) is in the high closing position, ensuring on the one hand the closing of the metering chamber (110) by tangential contact with the shaft (128) and on the other hand the communication between the metering chamber (110) and the outlet channel (118);

during metering: the single moving component (100) remains in the high closing position while the vane (126) is driven with a rotary movement of predetermined amplitude, thus discharging the corresponding quantity of product through the outlet channel; and at the end of metering: the vane (126) is immobilized in its end-of-rotation position and the single moving component (100) then slides into the low position to finish discharging the product and to allow the vane (126) to continue rotating up to its starting position.

18. The device as claimed in claim 17, wherein, at the end of metering, the vane (126) is immobilized in such a position that its active face (127) is vertical, it then being possible for the said active face to be scraped as the single moving component (100) slides towards its low position.

19. The device as claimed in claim 17, wherein, between two successive metering operations, the single moving component (100) does not return to its high closing position until the vane (126) has reached its predetermined starting position.

* * * * *